United States Patent
Herpst et al.

(10) Patent No.: US 6,594,008 B1
(45) Date of Patent: Jul. 15, 2003

(54) METHOD AND APPARATUS FOR THE PRODUCTION OF THIN FILMS

(75) Inventors: Robert Herpst, Mahwah, NJ (US); Kenneth B. Cuthbert, Quakertown, PA (US)

(73) Assignee: Robert D. Herpst, Mahwah, NJ (US)

(*) Notice: Subject to any disclaimer, the term of this patent is extended or adjusted under 35 U.S.C. 154(b) by 126 days.

(21) Appl. No.: 09/722,978

(22) Filed: Nov. 27, 2000

Related U.S. Application Data

(62) Division of application No. 08/958,453, filed on Oct. 27, 1997.
(60) Provisional application No. 60/046,044, filed on May 9, 1997, and provisional application No. 60/029,516, filed on Oct. 28, 1996.

(51) Int. Cl.[7] .................................................. G01J 1/10
(52) U.S. Cl. .................................. 356/243.1; 356/243.8
(58) Field of Search ................................. 356/319, 326, 356/243.1, 243.4, 243.8

(56) References Cited

U.S. PATENT DOCUMENTS

| | | | | |
|---|---|---|---|---|
| 5,157,455 A | * | 10/1992 | Macri et al. | 356/243.8 |
| 5,238,878 A | * | 8/1993 | Shinohara | 134/33 |
| 5,395,649 A | * | 3/1995 | Ikeda | 118/50 |
| 5,612,782 A | * | 3/1997 | Keranen et al. | 250/252.1 |

FOREIGN PATENT DOCUMENTS

EP 0718048 A1 * 6/1996

* cited by examiner

Primary Examiner—Zandra V. Smith
(74) Attorney, Agent, or Firm—Roger M. Rathbun

(57) ABSTRACT

Method and apparatus for forming thin films by the application of a film forming liquid to a substrate at rest or rotating a speed up to 500 rpm and then rotating the film forming liquid on the substrate at a speed and for a time sufficient to form the thin film. Such films can be used for analysis by spectrophotometric methods. Apparatus for forming such thin films is also disclosed.

3 Claims, 8 Drawing Sheets

METHOD AND APPARATUS FOR THE PRODUCTION OF THIN FILMS

RELATED APPLICATIONS

This is a Divisional application of U.S. Ser. No. 08/958, 453, filed Oct. 27, 1997 and which was, in turn a Continuation Application of U.S. Ser. No. 60/046,044 filed May 9, 1997 and U.S. Ser. No. 60/029,516 filed Oct. 28, 1996.

FIELD OF THE INVENTION

The present invention is directed to a method and apparatus for the production of thin films produced from liquids that undergo phase transition to a viscoelastic state such as polymers and resins which have been dissolved or melted, the liquids are placed onto a substrate and the substrate is rotated in a manner and under such conditions that a uniform thin film is produced which can be readily removed from the substrate. Such thin films can serve as samples for analysis by infrared spectroscopy or as carrier vehicles for samples to be analyzed by infrared, x-ray fluorescence ("XRF") or other spectrographic methods and the like.

Films made in accordance with the present invention can also be used as standards for calibration of Infrared and FTIR spectrophotometers and carrier films suitable for XRF can also be used as calibration standards for XRF spectrophotometers.

BACKGROUND OF THE INVENTION

The formation of coated substrates is known in the art. In this technology, a coating material is prepared in the form of a coating liquid and then adhered to a substrate in a manner and under such conditions that the coating remains affixed to the substrate. For example, Hiroyoshi U.S. Pat. Nos. 5,238, 713 and 5,116,250 disclose a coating apparatus including a spinning chuck rotatably supported within an enclosure which holds a substrate. The substrate is a semi-conductor wafer or glass and the coating material is typically a photoresist masking material. The purpose of applying the coating material to the substrate is to form a permanent bond therebetween (i.e. to mask portions of the semi-conductor).

The coating operation is performed by applying a liquid coating material to the top surface of the semi-conductive substrate which is being continuously rotated at high speeds. The liquid coating material is typically applied by a nozzle or other dispensing device. The liquid coating material is typically applied under continuous flow conditions and then drawn outwardly by rotating the table upon which the substrate rests at high speeds. The process relies upon centrifugal force to spread the coating material outwardly to form a coating layer which strongly adheres to the substrate. Such coatings are applied to protect the substrate (e.g. semi-conductor wafers and glass) by remaining permanently bonded thereto.

SUMMARY OF THE INVENTION

The present invention is directed, not to producing an adherent coating on a substrate, but rather to producing a thin film that may, if required, be readily removed from the substrate. Such thin films can be used, for example, as optical samples for infrared spectroscopy or as carriers for XRF, infrared and other forms of spectroscopy. The conditions under which the film is made make use of both centrifugal force and centripetal force and thus the process clearly distinguishes from those processes, like the references mentioned above, which produce adherent coatings on substrates.

The present invention is specifically directed to methods and apparatus for forming a thin film on a substrate which film can be easily removed so that it may be used as a sample and/or a medium for spectroscopy. When used as a sample for spectroscopy, the thin film must be optically transmissive in the spectral region of interest. When used as a carrier or medium, the film must be non-absorbing or neutral so that it is not detected by the spectrophotometer in the region where the sample is absorbing or detected.

In another aspect of the invention, the thin films can be used as calibration standards for XRF and other spectrophotometers. In another aspect of the present invention, films of polymers can be used as calibration standards for IR spectrophotometers.

BRIEF DESCRIPTION OF THE DRAWINGS

The following drawings in which like reference characters indicate like parts are illustrative of embodiments of the invention and are not intended to limit the invention as encompassed by the description of the invention herein.

DETAILED DESCRIPTION OF THE INVENTION

Figure 1:
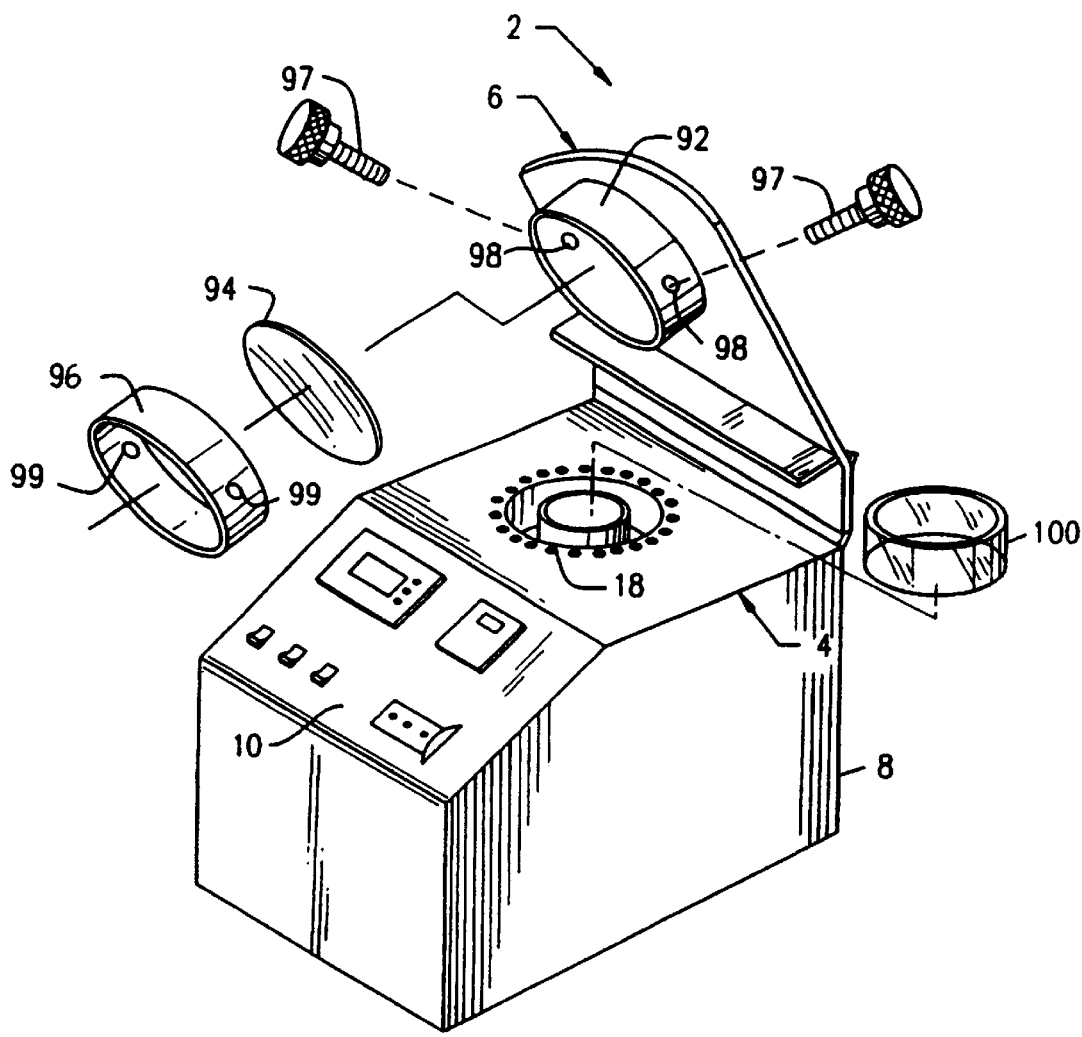
FIG. 1 is a partially exploded perspective view of an embodiment of an apparatus for forming thin film in accordance with the present invention.
Figure 2:
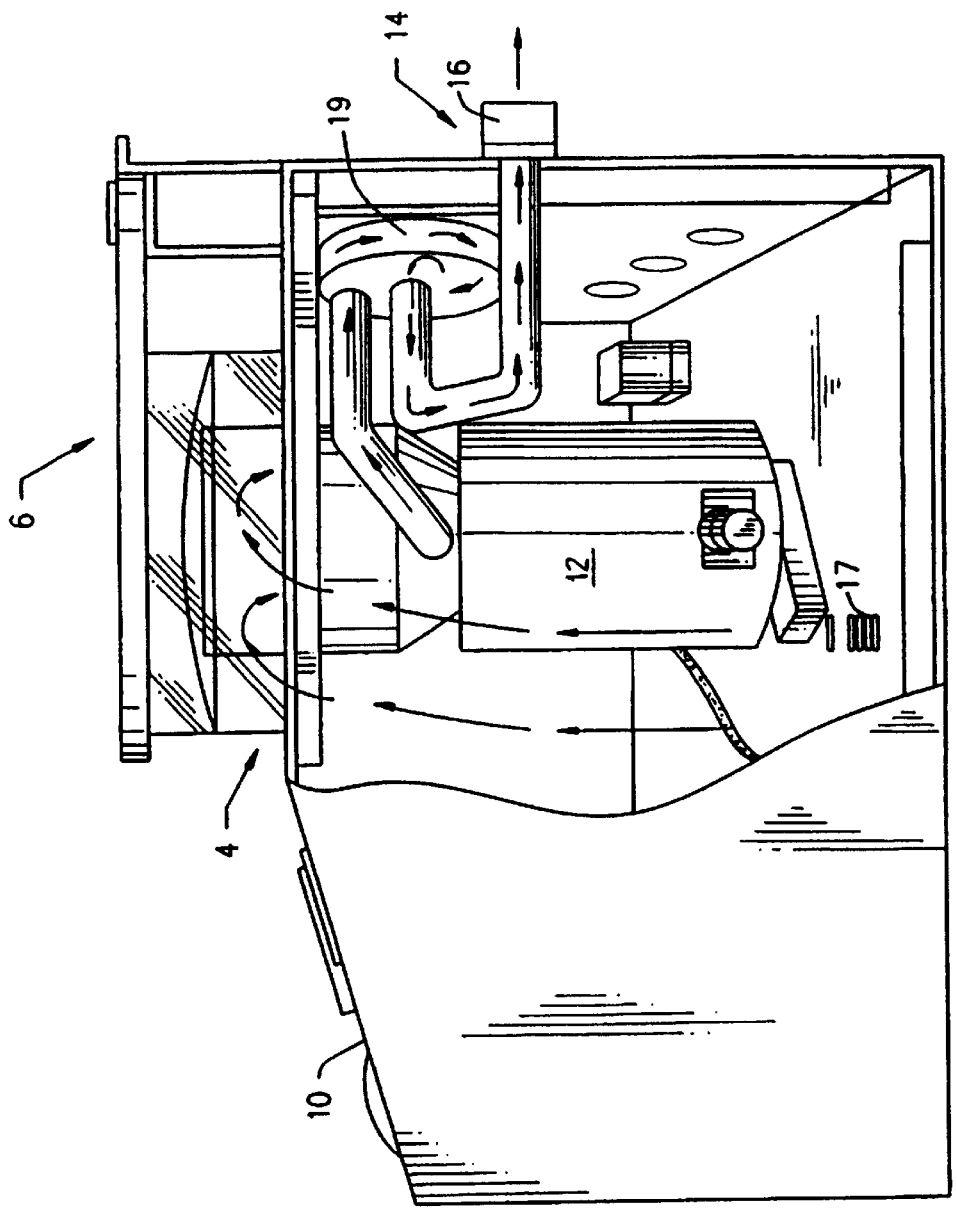
FIG. 2 is a partial side view of the apparatus shown in FIG. 1.

The present invention is directed to a method and apparatus for forming thin films. The sample is intended to be removed or to remain stretched over the aperture of a frame, or to be placed on a substrate which is transmissive. The thin film can be removed, in all cases to facilitate analysis by spectroscopy or any other technique. Such films can be employed in technologies where films of uniform and/or reproducible thickness are desired or where such films can be used as a carrier or medium. As used herein, spectroscopy includes infrared, Fourier transform infrared, near infrared, Raman and x-ray spectroscopy.

As used herein the term "a sample for spectroscopy" shall mean either a thin film sample which is a sample or a sample contained within a thin film, any of which can be analyzed by one or more of infrared (IR), Fourier transform infrared (FTIR), near infrared (NIR), Raman, x-ray fluorescence (XRF) or other spectrographic methods. As used herein the term "carrier" or "medium" shall mean that the thin film contains, holds, supports, suspends or carries another material (e.g. metal) which can be detected by spectroscopy. As also used herein the term "substrate" shall mean a surface capable of receiving a film forming liquid and/or a frame in which the liquid is suspended between opposed supporting surfaces (e.g. liquid is placed in an opening defined by a cylindrical supporting structure).

Thin films can be made of any substance that can be made flowable (viscous) which will undergo a phase transition to a viscoelastic state when rotated on a substrate in the manner described herein. Such materials include, but are not limited to, polymers, resins, monomers in liquid form, glues, adhesives, paints, varnishes, lacquers, nail polish, hair spray, urethanes, polyurethanes, proteins, animal tissues, cell samples and the like, alone or in combination with a suitable solvent each of the above substances being referred to herein as a "film forming liquid".

A thin film of the present invention can be formed by placing the film forming liquid on a substrate at rest or at speeds up to 500 rpm, preferably up to 200 rpm and then rotating the substrate at a speed sufficient to form the thin film, typically up to 5,000 rpm. In this method, centrifugal and centripetal forces are employed. Centripetal force is created by the rotation of the substrate around the axis of a shaft, and this inward directed force drives the film forming liquid towards the center. Centrifugal force creates an outward pulling on the film forming liquid. At the same time, cohesion creates on inward force on the film forming liquid while adhesion causes the film forming liquid to stick to the substrate. These opposing forces result in a tensioning as the film forming liquid undergoes the phase transition from the liquid state to the elastic state to the solid state. At some point during the phase transition the opposing forces cease to have any further effect on the transitional formation of the film and the film ceases to change form. However, the cohesive bond of the more solid molecules now holds the film together in a way that gives it more structural integrity than a liquid and also makes the film sufficiently strong in most cases to allow it to overcome the adhesive force of the film to the unlike molecules of the substrate. Accordingly, the last step in the process is the overcoming of the adhesive forces by peeling the film from the substrate which can readily be accomplished in most cases in accordance with the present invention.

It is understood that in certain cases the film forming liquid will adhere so strongly to the substrate that it cannot be removed. Substances such as monomers in liquid form which do not undergo phase transition to a solid also cannot be removed. In these situations, the film must be cast on a transmissive substrate such as an optical crystal or on a reflective surface so that analysis can be performed by reflection. In another preferred embodiment of the invention, films that cannot be removed from the substrate are cast on frames (i.e. a space defined by spaced apart supporting structures) as discussed below and the frame is then placed on the substrate and rotated at high speeds to regulate the thickness and consistency of the film.

An apparatus for performing the methods of the present invention is shown in FIGS. 1–4. Referring to FIGS. 1–4, there is shown an apparatus 2 for forming thin films. The apparatus includes a rotatable substrate section 4 with a protective shield assembly 6 thereover. The apparatus includes a housing 8 preferably having a control panel 10. The control panel 10 enables control preferably automatically, of the turning on and off of the rotation cycle, the length of time of the film forming operation and/or the rotational speed of the substrate upon which the film is formed. As shown specifically in FIG. 2, operation of the rotational substrate section 4 is performed by a motor 12 which is capable of rotating the substrate to speed equal to or exceeding 500 rpm and typically up to 5,000 rpm or higher. Removal of vapors as the liquid film forming substance undergoes phase transition to a thin film is made possible by an exhaust system 14 which removes vapors through an exit vent 16.

Removal of vapors through the 16 is made possible by providing for the intake of air through: a series of intake vents 17. The air is drawn through the vents 17 and travels upwardly in the direction of the arrows shown in FIG. 2 into the rotatable substrate section 4 and through openings 18 (see FIG. 1). The air draws vaporized materials from the film forming liquid into the exhaust system 14 through a fan 19 or the like.

As previously indicated, thin films in accordance with the present invention are produced by placing a quantity of a film forming liquid on a substrate at rest or rotating at low speeds up to 500 rpm, preferably up to 200 rpm then rotating the substrate at a speed sufficient to form the thin film (i.e. typically up to 5,000 rpm or higher).

Figure 3:
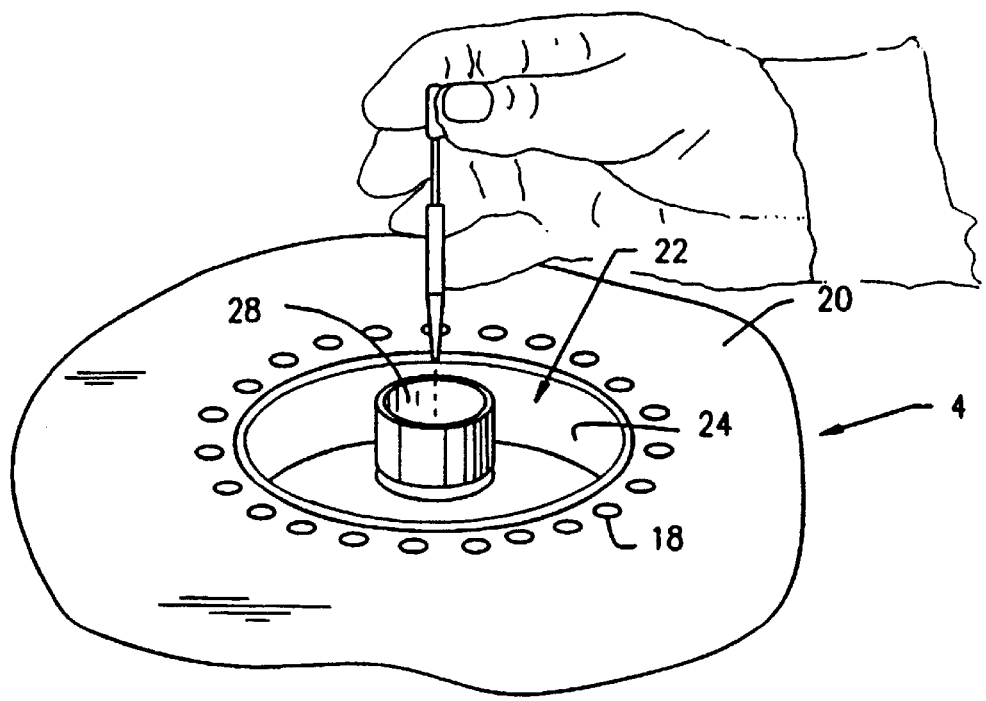
FIG. 3 is a perspective view of a substrate assembly for receiving a film forming liquid and the application of the liquid to the substrate.
Figure 4:
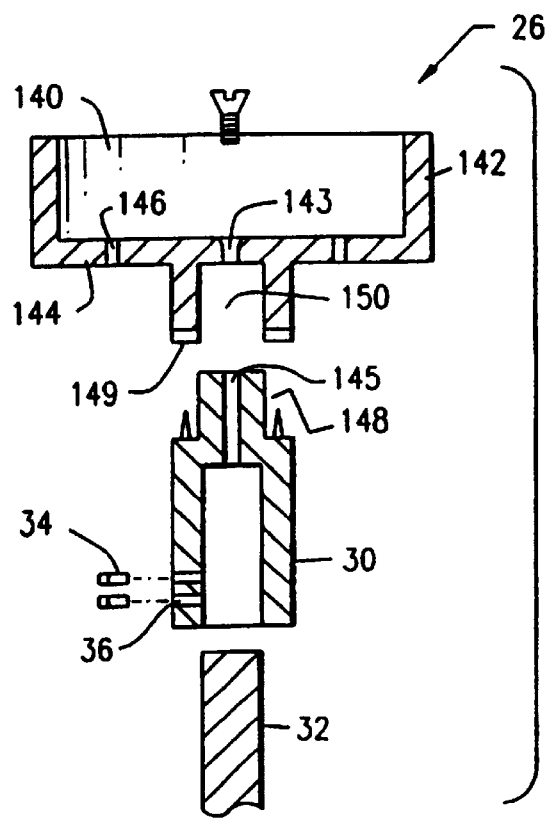
FIG. 4 is a cross-sectional side view of the support mechanism for holding the substrate assembly within the apparatus.

Referring again to FIG. 1, the thin film is formed in the rotatable substrate section 4 of the apparatus 2. As best shown in FIG. 3, the rotatable substrate section 4 includes a panel 20 having openings 1B for the intake of air as previously described enabling air to circulate and to assist in removing the vapors through the exhaust system 14 as shown in FIG. 1. Within the panel 20 is a cylindrical well 22 having a sidewall 24 along the circumference thereof. Set within the well 22 and below the level of the panel 20 is a rotatable substrate assembly 26 shown in detail in FIG. 4. The rotatable substrate supporting device 26 includes an opening 28 for receiving a substrate assembly as described in detail hereinafter with respect to FIGS. 5–14. The supporting device 26 as shown in FIG. 4 is secured to a connecting or coupling device 30 which operatively connects the supporting device 26 and a substrate assembly secured therein to the motor 12 (see FIG. 2) through a shaft 32. The connecting device 30 is secured to the shaft 32 in a conventional manner such as by screws 34 which enter the connecting device 30 through holes 36.

The supporting device 26 can be any shape and includes means to secure a rotatable substrate, such as a cavity 140 defined by at least one wall 142 and a bottom surface 144.

The cavity is of sufficient dimensions to have a substrate assembly secured therein. Vents 146 may be provided in the bottom surface 144 to allow entrapped air to escape when the substrate is placed into the cavity 140 to allow proper seating of the substrate.

Some means of attachment (e.g. a screw 141 insertable into a groove 143) is provided to enable the supporting device 26 to be secured to the connecting device 30. The screw 141 fits into the hole 145 of the connecting device 30. In addition, pins 147 attached to the connecting device 30 are insertable into openings 149 of the supporting device 26. As shown specifically in FIG. 4, the connection device 30 has a projection 148 which is operatively secured within a corresponding cavity 150 of the supporting device 26.

As previously indicated a substrate assembly is secured within the supporting device 26 to provide a substrate on which a thin film can be formed. Examples of suitable substrates are shown in FIGS. 5–14.

Figures 5, 6:
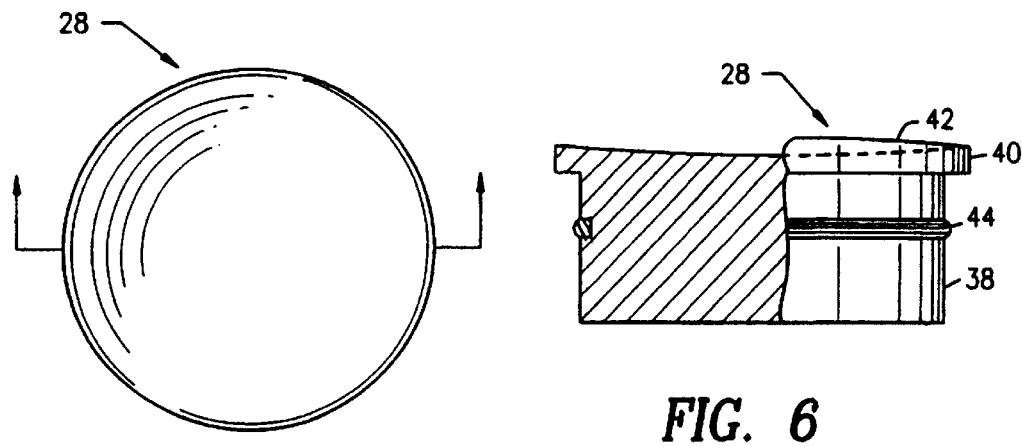
FIG. 5 is a plan view of one embodiment of a substrate assembly used to form a thin film in accordance with the invention.
FIG. 6 is a partial side view of the substrate assembly shown in FIG. 5.

Referring first to FIGS. 5 and 6, there is shown a first embodiment of a substrate assembly 28 which is comprised of a lower section 38 and a base 40 which provides a surface 42 on which the film forming liquid can be deposited. The lower section 38 is adapted to be secured within the supporting device 26 through the lower section 38 and particularly by an O-ring 44 which may be made of any flexible material such as rubber or the like.

As shown best in FIG. 6, the surface 42 of the base 40 preferably has a slightly concave shape. It will be understood that the surfaces can be planar, concave or convex (not shown). A concave surface provides additional resistance against the film forming liquid as it spreads out while the substrate assembly 28 is rotated at high speeds. It will be understood, however, that for some film forming liquids of generally higher viscosity, a planar surface may be employed as well as specifically shown in FIGS. 9 and 10. In particular, the base 40 has a planar surface 49 especially adapted for higher viscosity liquids.

Figures 7, 8:
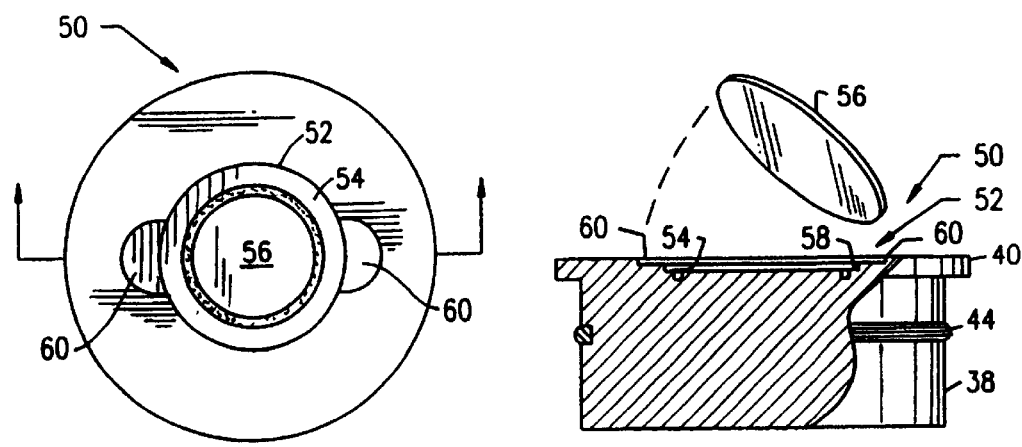
FIG. 7 is a plan view of another embodiment of a substrate assembly which is particularly adapted for holding a slide or crystal to form a film thereon.
FIG. 8 is a partial cross-sectional view of the substrate assembly shown in FIG. 7.
Figure 9:
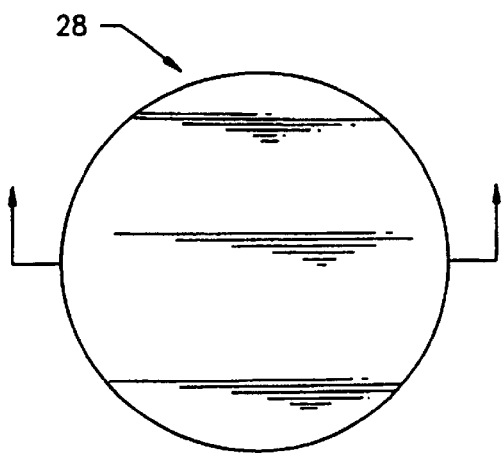
FIG. 9 is a plan view of still another substrate assembly for forming a film in accordance with the present invention.
Figure 10:
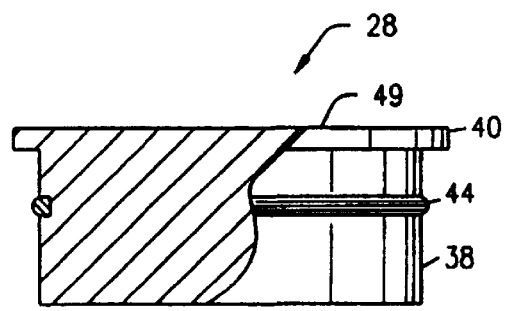
FIG. 10 is a partial cross-sectional view of the substrate assembly shown in FIG. 9.

A further embodiment of the substrate is shown in FIGS. 7 and 8. Referring to FIGS. 7 and 8, there is shown a substrate assembly 50 having a lower section 38, a base 40 and a ring 44 essentially as described in connection with the embodiment of FIGS. 5 and 6. In this embodiment, the base 40 is modified to have a surface 52 having a well 54 therein for holding a removable substrate 56 such as a slide or crystal. The shape of the removable substrate 56 is circular as shown specifically in FIGS. 7 and 8. However, the shape of the substrate 56 may be modified to accommodate substrates having three or more sides. In particular, the well 54 is provided with a cavity 58 for housing the substrate 56. Above the position of the substrate 56 are opposed areas 60 which can be used to grip the sides of the substrate 56 so that it can be readily removed from the cavity 58.

Figure 11:
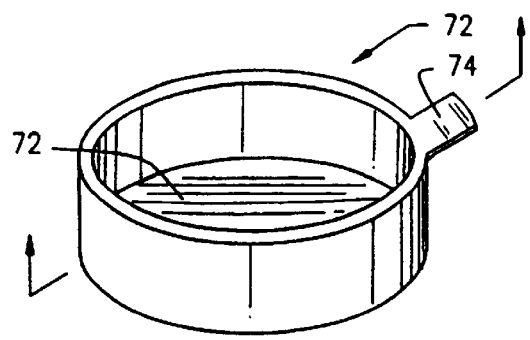
FIG. 11 is a perspective view of still another substrate assembly for use in forming thin films in accordance with the present invention.
Figure 12:
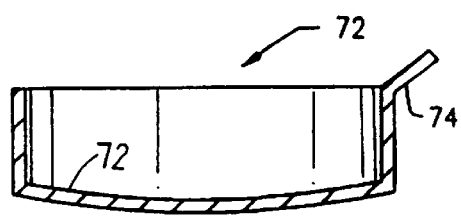
FIG. 12 is a cross-sectional side view of the substrate assembly shown in FIG. 11.

The rotatable assembly may also be provided with a substrate in the form of a sample cup which itself defines a cavity and has a handle for easy removal from the base of the rotatable assembly. Sample cups made of thin gauge aluminum are commercially available such as from Fisher Scientific Co. Referring to FIGS. 11 and 12, there is shown a sample cup 70 having a surface 72 on which is placed the film forming liquid. The surface may be planar or as best shown in FIG. 12, may be slightly concave to accommodate lower viscosity liquids or liquids which do not readily wet the substrate. A handle 74 may be provided to facilitate removal of the sample cup from the supporting device 26. The sample cup is preferably made of thin gauge aluminum which can be easily cut away to provide ready access to the thin film formed thereon. In addition, the bottom of the sample cup can be used as a reflective substrate.

Figure 13:
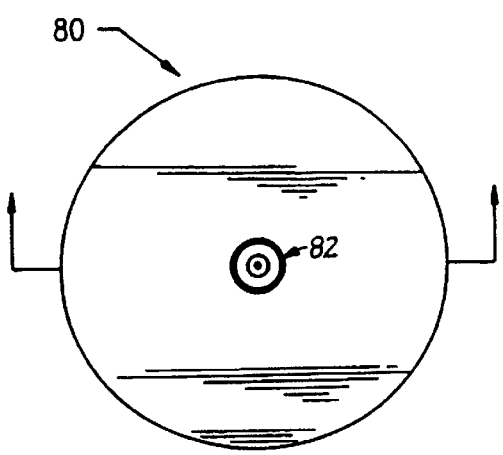
FIG. 13 is a plan view of a further substrate assembly for use in forming thin films in accordance with the present invention.
Figure 14:
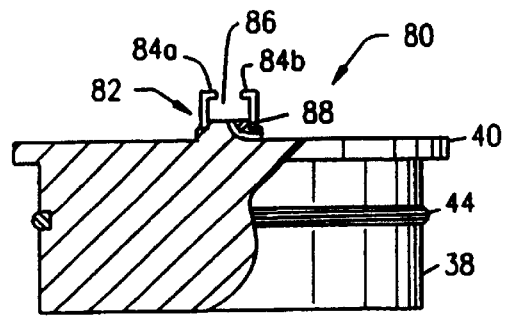
FIG. 14 is a partial cross-sectional view of the substrate assembly shown in FIG. 13.

The substrate of the present invention may be in the form of a frame which may be in the form of a vial cap having a hole therein in which the film forming liquid is suspended thereon or the like. Referring to FIGS. 13 and 14, there is shown an embodiment of the invention in which the base 40 of a substrate assembly 80 has a platform 82 having a pair of opposed supports 84A and 84B which are spaced apart at a distance defining an opening 86 sufficient to suspend a quantity of the film forming liquid therebetween. Beneath the opening 86 is a pathway 88 which enables vapors to be removed from the film-forming area.

The apparatus 2 of the present invention is optionally provided with a safety device to ensure that the film forming liquid does not splatter and come into contact with the user. Such a protective shield would be highly desirable if the film forming liquid has any toxic properties with regard to exposed areas of the body such as the eyes.

Referring to FIG. 1, the protective shield assembly 6 comprises a lid 90 having a cylindrical extension 92 therefrom which fits over the rotatable substrate section 4 and particularly over the rotatable substrate assembly 26. Contained within the extension 92 is a plate 94 (e.g. a watch glass) which serves to protect the lid 90 from splatter of the film forming liquid. To ensure proper positioning of the plate 94, a cylindrical insert 96 having an outside diameter slightly smaller than the inside diameter of the extension 92 is placed within the extension 92 and serves to maintain the position of the plate 94 within the extension and to facilitate removal of the plate 94 for cleaning or replacement. The plate 94 and the insert 96 are secured in place such as by the use of set screws 97 which are secured in openings 98 of the extension 92 and openings 99 in the insert 96.

In a preferred form of the invention, the well 22 of the rotatable substrate section 4 is provided with a removable sleeve 100 to protect the inside of the well against splatter of the film forming liquid. The sleeve 100 is removable to facilitate cleaning or replacement thereof.

Figure 15:
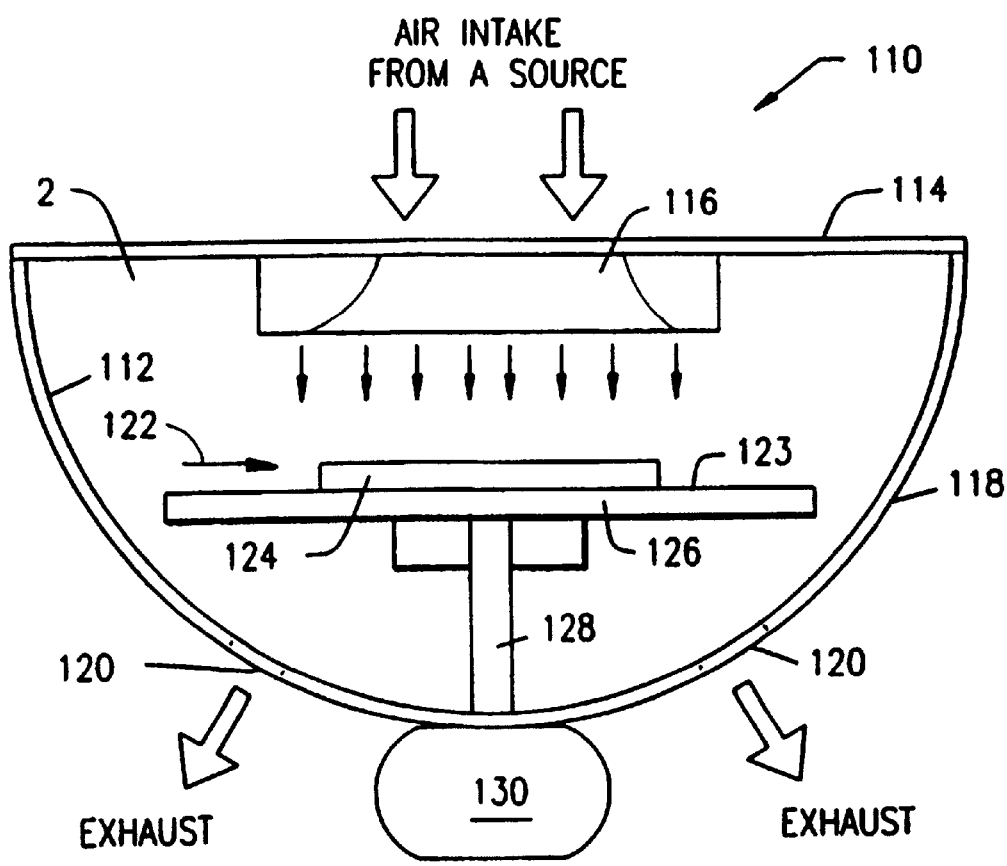
FIG. 15 is a schematic cross-sectional side view of an embodiment of another apparatus for forming a thin film in accordance with the present invention.

In another embodiment of the invention, the deposition of a thin film on a rotatable substrate is shown in a hemispherical housing. Referring to FIG. 15, there is disclosed an apparatus 110 comprised of a housing 112 having a hemispherical shape including a cover 114 having an opening 116 therein. The housing has a curvilinear lower portion 118 including at least one exhaust port 120. A substrate assembly 122 extends parallel to the cover 114 and has an impeller 123 associated therewith to draw air into the housing to remove vapors from the housing. A substrate 124 is provided on a base 126 which is operatively connected to a rotatable shaft 128 which in turn is controlled by a motor designated by the numeral 130. Rotation of the shaft 128 causes a film forming liquid on the substrate 124 to spread out and form a thin film when the shaft 128 is rotated at speeds of at least 500 rpm. Further details of the present invention will now be described below.

The present invention is directed, not to producing adherent coating on a substrate as in some prior art systems previously mentioned, but rather to producing a thin film that may, if required, be readily removed from the substrate or cast over an aperture so that no substrate contacts the center of the film. Such thin films can be used, for example, as optical samples for infrared spectroscopy or as carriers for XRF, infrared and other forms of spectroscopy. Conditions under which the film is made make use of both centrifugal force and centripetal force. For example, the thin-film forming liquid in the present invention is not applied under continuous flow conditions, but rather in discrete units (e.g. droplets or doses). In addition, the film forming liquid is applied to the substrate at rest or when the substrate is operating at low speed conditions (i.e., under 500 rpm or less). Further, the film forming liquid is deposited at the center of the substrate at the axis. Films cast using the present invention display the unique property of radial symmetry. This property does not occur in films that are spin cast using devices that employ only centrifugal force. The film radiates from the axis towards the perimeter of the substrate. Furthermore, only after deposition is completed is the substrate rotated at high speeds and with the present invention films can be cast not only on a planar substrates, but over a parabolic substrate or the aperture of a frame.

Films formed of polymers, resins and monomers are useful in Infrared (IR), Near Infrared (NIR), Raman and XRF. First, thin films can be analyzed as samples by use spectroscopy of IR, NIR and Raman spectroscopy. Because polymers, resins and monomers can often be made into transmissive films they can be readily analyzed as samples using IR, NIR and Raman spectroscopy in the transmission mode. This means that the sample is sufficiently transparent to the energy employed in the spectrophotometer (e.g. infrared) that the energy can penetrate the sample and the absorbance of energy caused by the excitation of the molecular bonds of the sample can be readily detected.

Certain polymers do not cause detectable interference with infrared energy in certain portions of the spectrum. For example, polytetrafluoroethylene is nonabsorbing from 4,000 to 1,300 wavenumbers ($cm^{-1}$). For this reason, certain polymers can be used as carriers or mediums for samples that absorb infrared energy in the region where the medium is nonabsorbing. Typically, this has been done in the past by applying a sample to the surface of an insoluble polymer film such as polytetrafluoroethylene.

Polymers are also used as a medium or carriers for samples in XRF spectroscopy because they are not detected by the instrument. Typically, an inorganic sample (metal for example) is placed on a piece of polymer film to suspend the sample within the instrument in a neutral medium. A sample suitable for XRF that is dissolved in a carrier polymer film can also be used as a standard for calibration of XRF spectrophotometers. Similarly, samples dissolved in a suitable film can be used as standards in connection with other spectrographic methods.

Thin films cast by the methods and with the apparatus of the present invention can be substituted for pressed film samples and for carriers or mediums used in all fields of spectroscopy. Because the cast films are easier to prepare than pressed films, they can save hours of time in the lab. Furthermore, they are considerably less expensive to use than films sold as carriers or medium films which are die cut from extruded sheets. Because the films can be made of varying thicknesses with little effort by varying the speed of rotation, varying the concentration of the sample and by layering, and because they can be made of varied layered substances, they offer a wide variety of uses both as samples of multiple components and as carriers or mediums. Variations of film thickness can, for example, vary sensitivity of the sample to detection by the instrument by increasing the pathlength (the thickness of the sample) and thereby altering the absorbance of the sample as dictated by Beer's Law.

Layering can be used to study the effect of ultraviolet radiation on a protective film placed over another polymer, which has implications in food storage chemistry. Layering also offers the potential to study a wide variety of substances in use in the cosmetics industry, such as by layering hair spray over a protein that simulates human hair. The apparatus and method of the present invention can provide the integration of samples with the thin films. This can be of considerable importance because it not allows the sample to be preserved, but also allows the sample to be preserved in the same proportion, dispersion and intensity, thereby permitting replication of test results with complete accuracy. In addition, dispersion of the sample within the transmissive carrier or medium can result in enhanced sensitivity for some samples.

Highly absorbing polymers cast as films in the manner herein described can be used to calibrate IR spectrophotometers if they exhibit the traits required for a calibration "standard"—consistency, uniformity and reproducibility. Of course, the spectra of these films must exhibit absorption peaks over enough bands through the spectral region where spectrophotometer is designed to operate to assure that the instrument is functioning properly over the entire spectral region of interest. Calibration of the abscissa or X axis is a demonstration that the band positions exhibited when the calibration standard is scanned in the instrument have remained relatively constant in wavenumber values. Calibration of the ordinate or Y axis is a demonstration that the optical performance of the instrument and the detector have not degraded and also is useful for comparing the photometric quality of performance of one instrument against another. Such ordinate standards are referred to herein as ordinate photometric standards.

Polystyrene is now used by the National Institute of Standards (NIST) as the standard of choice to perform abscissa scale calibration of the abscissa of IR spectrophotometers under NIST standard 1921. It is understood, however, that other polymers could be used, particularly if films were formed in a manner that would result in consistent film thicknesses such as casting films by means of the invention described herein. But, polystyrene film has certain deficiencies as a calibration standard that arise from (i) the way that it has been formed commercially, and (ii) the fact that it is a stand alone film with a certain amount of surface reflectivity.

The ability to vary film thickness and to make very thin films also makes the peaks in spectra produced by the present invention more useful. For example, IR spectrophotometer calibration standards are made from extruded sheets of polystyrene. These films are used to calibrate the abscissa scale or "X" axis of the spectrophotometer by determining whether bands appear in the proper location as measured in reciprocal centimeters ($cm^{-1}$). Because extruded films are not available in thicknesses less than 38 microns, calibration films made from them often show peaks which exceed the ordinate scale or "Y" axis of the spectrophotometer because they are relatively thick at about 38 microns (0.0015 inches). For example, the bands at 2925 $cm^{-1}$ and 690.6 $cm^{-1}$ almost always show as peaks with apices that extend beyond the range of the "Y" axis as shown for example in FIG. 16.

Figure 16:
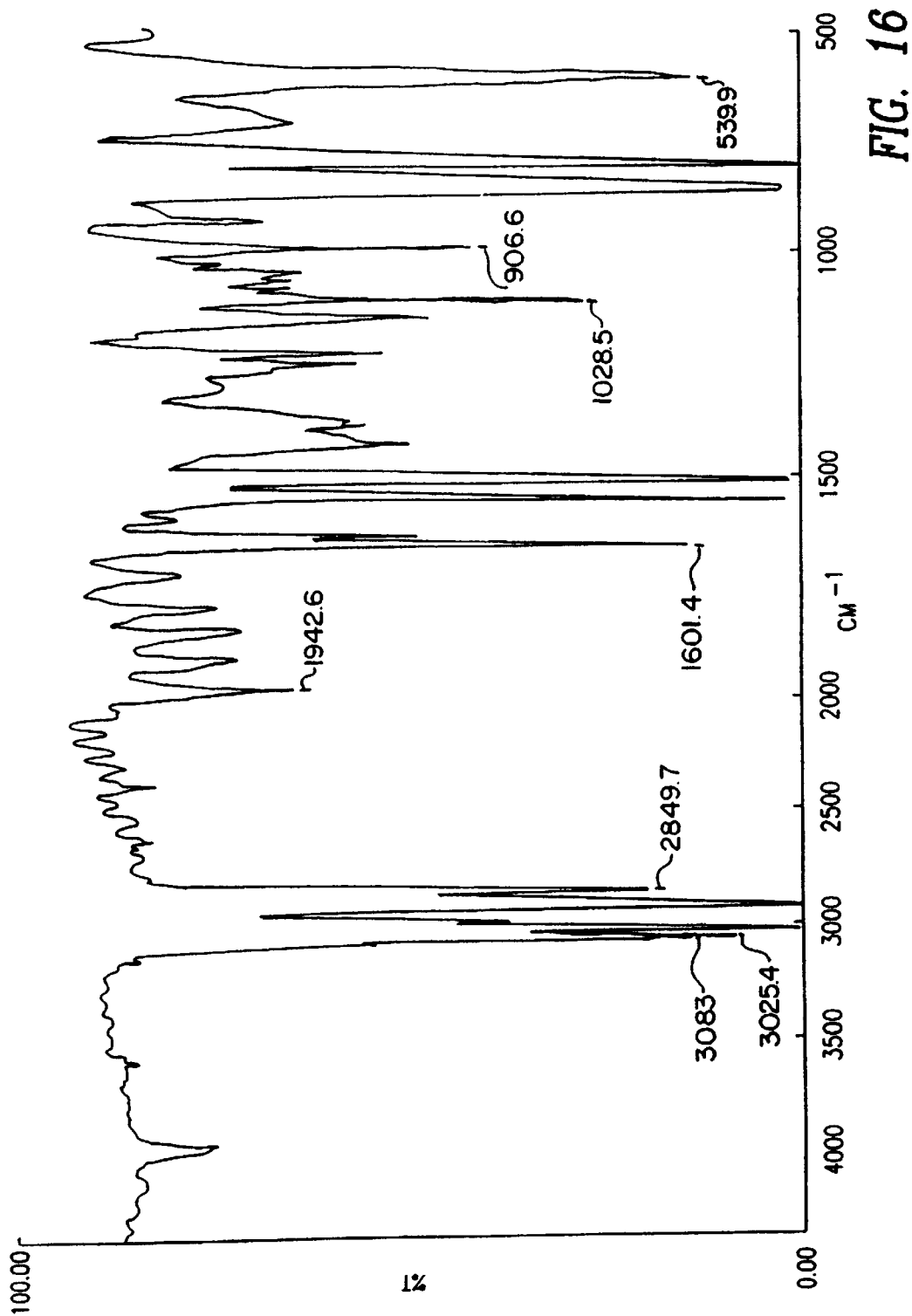
FIG. 16 is a spectrum of a Nicolet NIST traceable polystyrene calibration film known in the art in which peaks at 2925.1 cm$^{-1}$ and 690.6 cm$^{-1}$ exceed the "Y" axis of the spectrophotometer.

Referring to FIG. 16, there is shown a spectrum of a known standard in the form of a Nicolet NIST traceable polystyrene calibration film. The absorbances (shown as peaks) sometimes exceed the ordinate scale or "Y" axis of the spectrophotometer as shown in FIG. 16. Further, when absorbance is too high, the detail of the spectrum can be obscured as is evident if FIG. 9 in the case of the bands at 3082 $cm^{-1}$, 3060 $cm^{-1}$, 3025 $cm^{-1}$, 2925.1 $cm^{-1}$ (apex missing due to the peak exceeding the "Y" axis) and 2849.6 $cm^{-1}$. In addition, the reflective surface of the stand alone film can exhibit interference fringes which can cause the bands of various samples to appear in slightly different locations or which can obscure absorption peaks. Another deficiency is that the polystyrene films used now to calibrate the abscissa scale or "X" axis of the spectrophotometer do not have any utility for calibration of the ordinate scale or "Y" axis of the instrument as an ordinate photometric standard. Yet another deficiency is that the film thickness of commercially drawn polystyrene is inconsistent, which is one reason why such films are not useful for "Y" axis calibrations, the other being that they are not readily available in multiple thicknesses which are consistent. Many of these deficiencies can be cured using films cast in accordance with the present invention.

In accordance with the present invention, not only can the thickness of film made from polystyrene be varied, but they can be made very thin which keeps the peaks within the "Y" axis. And by altering the thickness of the film, the absorbance can be varied which allows use of films of different thicknesses to calibrate the ordinate or Y axis of the spectrophotometer. Furthermore, casting the films on transmissive substrates eliminates interference fringes that can partially obscure or distort peaks of interest in a spectrum.

Figure 17:
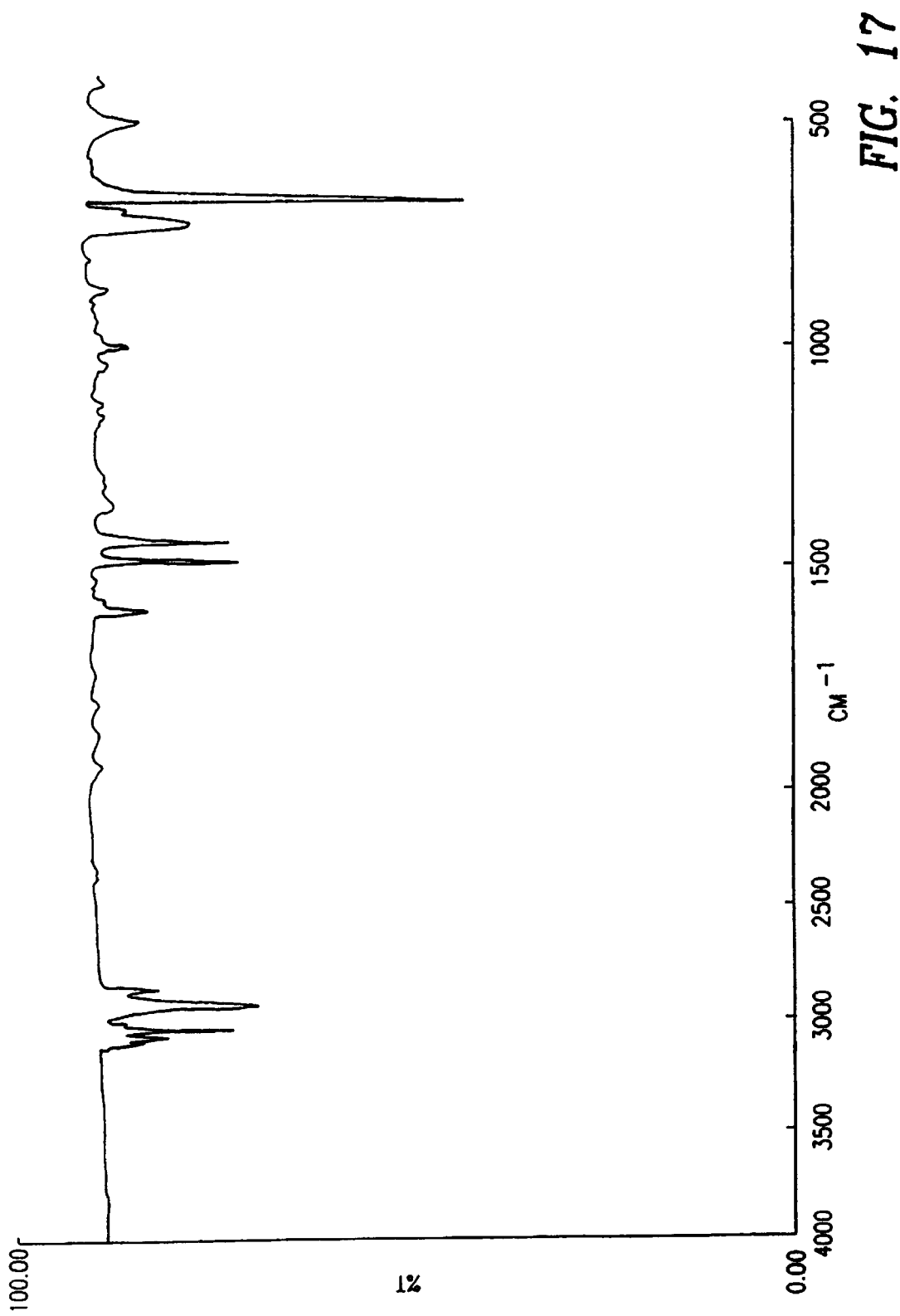
FIG. 17 is a spectrum of a polystyrene film cast on a KBr crystal in accordance with the present invention in which the peaks do not exceed the "Y" axis of the spectrophotometer.

Referring to FIG. 17, there is shown a spectrum of a polystyrene film cast on a KBr crystal in accordance with the present invention. The film can be made thin enough so that the peaks stay within the "Y" axis.

It must be understood that in certain cases, it is impossible to form a removable film due to the structure of the sample. Application of a fine powder of KBr, KCl, NaCl or another nonabsorbing optical crystal material to the substrate before the film is cast should result in the relatively easy removal of most strongly adhering films. In those cases where a film cannot be removed it can be applied to a reflective removable substrate for analysis by reflection techniques. In the alternative, the film can be cast on a highly transmissive nonabsorbing substrate such as a KBr, KCl, or NaCl optical crystal or over a frame and the crystal urethane frame containing the film can be removed thereby allowing for analysis of the film through the aperture within the frame.

In accordance with the present invention, the film-forming liquid or other film forming material is dropped onto the substrate, which can be flat, concave or convex, when the same is at rest or is rotating at no more than 500 rpm. The power source must be capable of rotating the shaft at speeds up to 500 rpm in the first step of the method. In particular, a viscous fluid evenly distributes itself on a flat (or concave or convex) substrate. A fluid which is not completely homogeneous, such as human tissue, distributes relatively evenly on a flat substrate. The use of concave platens is useful for samples with difficult wetting properties. For example, polyvinyl alcohol with a ratio of solvent (water) that is somewhat higher than when the polymer is at a saturation state will not adhere to some flat substrates at speeds in excess of 1,500 rpm, but when a concave substrate with a radius of curvature of about 12 inches is employed the same material will adhere at speeds as high as 5,000 rpm. The concave substrate may be a substrate assembly of the type shown in FIGS. 5 and 6 or may be an aluminum weighing dish with a diameter of about 2", which is not only disposable but can also be used as a reflective background for specular reflection testing on an IR spectrophotometer. Convex substrates are useful for extremely thick samples which may be difficult to make into thinner films on a flat substrate, but which can be made thinner than would otherwise be possible when cast on a convex substrate.

The rotational velocity is constant after a brief period of acceleration. Any changes that occur to the fluid as a consequence of an applied force happen over time. Given any set of conditions, there is a fixed time interval from the point in time where a force is applied until the point where the force no longer has an effect on the condition of the fluid. Films formed on frames which are capable of reaching a viscoelastic state may also be rotated in the same manner to regulate the film thickness, provided that the rotation begins before the film becomes solid.

The other force which is employed in the present invention takes the form of a constant velocity stream of air molecules. The applied direction of this force is perpendicular to the plane of rotation. As a steady current of air molecules moves towards the surface of the fluid, the response is a collision of the air molecules with the rapidly vaporizing solvent molecules which were used to form the solution of film forming liquid. The solvent molecules are then conveyed away from the quickly changing fluid.

The first step in the process if a solvent is necessary is to dissolve a film-forming material such as a resin or polymer into a solvent or to otherwise make the film-forming material viscous. Virtually any soluble resin or polymer can be used to form a solution. Monomers in liquid form (which are already viscous and do not require a solvent) as well as molten resins and polymers and other soluble or liquid materials can also be used as can anything that can be converted to a viscous state such as by the application of heat. For example, polyvinyl alcohol may be dissolved in water, poly (vinylidene fluoride)—difluoroethane may be dissolved in cyclohexanol, polystyrene may be dissolved in toluene, polycarbonate may be dissolved in tetrahydrofuran and polyvinylacetate may be dissolved in anhydrous methanol. The amount of the resin or polymer which is dissolved in the solvent should be sufficient to provide a solution with a suitable viscosity. Typically, the amount of the resin or polymer dissolved in a solvent is from 5% to 30% by weight. The viscosity of the solution or other sample will affect the wetting properties of the sample and also the film thickness. The lower the viscosity and thinner the film that can be made from it at the same rotation speed.

The resulting film forming liquid or other film forming material is then placed on the substrate for an initial contact (wetting) phase while the substrate is at rest or in motion at no more than 500 rpm. After the initial contact (wetting) phase the substrate is then accelerated to a constant speed (e.g. a constant speed above 500 rpm and typically up to as much as 5,000 rpm) for a fixed time interval (typically from about 60 to 180 seconds). As a result there is formed a thin film which can be readily removed from the substrate (if made from a film forming liquid which undergoes a phase transition), or applied to a removable transmissive substrate such an optical crystal or, in rare cases, applied to a removable reflective substrate.

In a preferred embodiment of the invention an aluminum weighing dish is used for a substrate, as it is disposable, has a reflective surface and has a slightly concave bottom. Such an aluminum weighing dish can be used with means for mounting it to the rotatable substrate as a surface upon which to cast a film that either can or cannot be readily removed. If the film can not be removed, the dish can then be used in a specular reflection accessory to obtain spectra of the sample cast on the reflective bottom of the dish by the specular reflection technique or internal reflection technique. The edge of the sample cup can be cut off with a scissor or the like so that the bottom of the cup can be used as a flat surface.

In addition, the substrate assembly can be altered to accept a frame on which a film has been formed as described above for the purpose of rotating the frame to control the thickness of the film thereon before the film becomes solid.

The film may be made by physical contact of the film forming liquid with a solid body ("frame") which contains or surrounds a hole or opening. The film made by this method is formed by using the forces of cohesion and adhesion. The attraction of the molecules of the film forming liquid to each other—cohesion—produces a tendency of the liquid molecules to pull towards the center and away from the area where there is no liquid. This is the force that tends to make liquids form droplets when they fall on a surface. On the other hand, the film forming liquid also tends to want to stick to unlike molecules—adhesion. When energy is applied to the surface of the film forming liquid such that the surface is stretched beyond its minimum surface area, cohesion tends to make the liquid want to return to the minimum surface area, while adhesion tends to make the liquid want to stick to the neighboring solid frame. This stretching is referred to as surface tension.

A thin film is formed in accordance with the present invention by contacting all sides of the frame with the film forming liquid in a manner that allows the surface tension of the film forming liquid to form an unbroken film over the aperture. As the phase transition from liquid to solid occurs, the cohesive bond between like molecules becomes stronger and lessens the tendency (in the case of film forming liquids that reach a viscoelastic state such as polymers) of the film to break as it is stretched. The aperture must be small enough that the surface tension induced by stretching the film forming liquid over the frame and the aperture will not cause the film to break until the phase transition has been sufficiently completed to strengthen the film. Viewed in another way, the cohesive forces become stronger as the phase transition approaches elasticity and the effect of the opposing forces on the film are neutralized at some point during the phase transition. The frame can be metal or any substance which is both rigid and whose integrity will be unaffected by the composition of the film forming liquid. A standard vial cap having a circular hole in the top to accommodate a septa can be used as a frame.

In another embodiment of the invention, the resin or polymer solution is impregnated or mixed with a sample (usually an inorganic material) so that the film can be used as a carrier of medium for XRF spectroscopy. The sample materials that may be mixed or suspended in the film include metals, ions and halogens. For example, a water-soluble polymer such as polyvinyl alcohol can be used as a medium for XRF spectroscopy. The carrier material is effective because it is invisible when tested in an XRF spectrophotometer and is capable of forming a thin film that will withstand radiation. Such carrier films can also be used as standards for XRF spectroscopy and other spectroscopic methods. Unlike standards that are suspended in water, these standards will be permanent as there will be no water to evaporate that will change the concentration of the standard.

By way of example, PVA dissolved in water is placed on the substrate rotating at a speed sufficient to place the PVA in a viscoelastic state. Before the PVA becomes completely solid a sample will adhere to it. A non-water soluble material in the form of a fine powder (e.g. metal ore) intended to be used as a sample is evenly dispersed on another substrate and the PVA containing substrate is then pressed on the second substrate where the sample sticks to the PVA. Thereafter, the PVA film in which the sample has become impregnated, is then removed from the first substrate for XRF analysis of the sample. In the alternative, the sample is suspended or dissolved in the PVA before the PVA film is cast.

In yet another embodiment of the invention, the resin or polymer solution is mixed with a material capable of analysis by IR, FTIR, Raman, NIR or other spectrographic methods. For example, this method is useful for making a version of a calibration standard for IR spectroscopy wherein a highly absorbing substance such as Boron is mixed with the polymer, as discussed below as previously described.

A useful standard for calibration of an IR spectrophotometer must be: uniform, reproducible and permanent. Polymers, such as, but not limited to, polystyrene cast using the present invention on KBr or other transmissive or reflective substrates meet this standard. It is understood that other film forming liquids that can be cast by this method into a permanent film could also be used as standards if they exhibited absorption peaks at appropriate locations on a abscissa scale. The method of casting a film on a transmissive substrate for use as a standard is, first, to apply a known concentration of film forming liquid such as a dissolved polymer on a transmissive substrate. In the case of crystal such as KBr the wetting characteristics are such that, in a preferred embodiment of the invention, the crystal should be completely covered with the liquid polymer before rotation is commenced. The crystal or transmissive substrate is placed on a substrate as previously described. Thereafter, the substrate is rotated so that the transmissive substrate resting on top of it also rotates. The film is formed when the film forming liquid reaches a viscoelastic state.

The substrate must be rotated at the same reproducible speed for the same reproducible cycle time each time a film that is intended to be a standard is made and each film must be made from a sample of film forming liquid having the same concentration of sample.

In a preferred embodiment of the invention for use as a standard the film forming liquid is a polymer such as polystyrene and the polymer is dissolved in a solvent in a known and reproducible concentration. The film forming liquid such as a dissolved polymer is then allowed to dry, preferably in a desiccator jar, and then, in a preferred embodiment of the invention, the second side is coated with the same concentration of film forming liquid in the same manner and the film is then allowed to dry, again preferably in a desiccator jar.

In a preferred embodiment of the invention the film forming liquid is polystyrene and the substrate is a KBr crystal. Casting the film on both sides of the substrate will have the effect of sealing the substrate if the substrate might otherwise change or be unstable over time. KBr, for example, is hygroscopic, and as it absorbs moisture the amount of infrared energy that it will transmit decreases. By sealing both sides of a KBr crystal with polystyrene or some other film forming liquid that is not affected by moisture, the substrate becomes stable and is therefore useful in a standard. In another preferred embodiment of the invention the film is cast on a reflective substrate such as for use in specular or other reflectance modes of analysis in connection with making standards, and in yet another embodiment of the invention the film used for a standard is removed from the platen or other substrate on which it is cast. Such reflective substrates may be specially coated glass as shown in U.S. Pat. No. 5,160,826.

Another means of using films cast by the method herein described as standards is to add to the film making material a known amount of a foreign substance, such as Boron, which can create a distinct peak at a known band and of a reproducible intensity which will be useful to calibrate both the ordinate scale and the abscissa scale of an infrared spectrophotometer. In another preferred embodiment of the invention, the crystal substrate (such as KBr) on which a film intended to form the standard is cast is doped with a foreign substance such as Boron. The film then creates the absorption peaks which are used as the abscissa standard and the foreign substance creates the absorption peak or peaks that are used as the ordinate photometric standard. Boron, for example, shows only a single distinct peak within the spectral range of an infrared spectrophotometer at 1958.6 $cm^{-1}$. Conveniently, the Boron absorption peak appears at a spectral band where polystyrene is non-absorbing, which allows the use of polystyrene as a coating and an abscissa standard while the Boron is used as the ordinate photometric standard. It is understood that other combinations of coating materials and dopant foreign substances could be used in the same manner, as could doped films and layered films of different substances. The advantage of doping the crystal or the film itself is that the intensity of the absorption peak can be more precisely controlled and consistently applied than can multiple peaks in a film such as a polymer.

Yet another means of using films cast by the method herein described is to cast two or more films of different thicknesses, each of which, under Beers Law, will have different absorbance because the pathlength (thickness) of each film is different. By checking the consistency of the difference in the intensity or height of the absorption peaks of these two or more films, the ordinate scale or "Y" axis of an infrared spectrophotometer can be calibrated. At present ordinate photometric calibration is quite crude and is typically done not with two standards, but with one. This is inadequate for a number of reasons. First, the standards used are not sufficiently consistent in absorbance to produce consistent results. Further, there is no basis to compare the standard to a fixed point, as the baselines in FTIR spectrophotometers are not established by the use of a standard.

Using as an ordinate photometric calibration standard a single film cast of a polymer or other substance with a consistent film thicknesses cast by means of the invention will greatly enhance the accuracy of ordinate photometric calibration. Using matched pairs of two films from the same substance of differing thicknesses will eliminate much of the guess work and uncertainty associated with ordinate calibrations. There is the resultant advantage of comparing two standards to each other and these two standards can be produced so that they will not degrade over time in the manner discussed above. Degradation in instrument performance due to optical or detector deterioration can thus be detected. When only one standard is used, it is never certain what is occurring because the instrument itself provides the baseline for the test. With two standards the standards provide their own baseline.

There is a mathematical relationship between film thickness, viscosity and substrate rotation speed that is unique to that mixture, making it possible to predict film thickness based upon substrate speed. The faster the substrate is rotated, the thinner the film up to the point that the film reaches a plastic state. In a preferred embodiment of the invention, the speed of rotation is precisely controlled so as to facilitate not only variations in film thickness but also wetting of the substrate on which the film is cast. Since the apparatus accommodates the wetting properties of a variety of polymers and other film forming liquids, its utility is greatly enhanced. It has been found that certain polymers will not adhere well (wet) the substrate at some speeds. Therefore, to assure the utility of a coater in a variety of applications which may involve many different substrates, variable speed control is a desirable feature. In another preferred embodiment of the invention, control of the speed at which the rotation speed ramps up from a static state to the operating speed is also employed. Control of ramp speed provides optimal control of film thickness and also allows adaptation to the wetting properties of more samples. In another preferred embodiment of the invention, the controller used to regulate the speed is microprocessor based so that the speed is reproducible from run to run thereby facilitating reproducibility of film thicknesses from run to run. In yet another preferred embodiment of the invention, the cycle time during which the shaft rotates is precisely controlled to optimize the regulation and consistency of film thickness from film sample to film sample. As noted below, use of concave and convex substrates is also a wetting aid.

What is claimed is:

1. A method of forming a film exhibiting at least substantial radial symmetry and for calibrating an infrared or Fourier transform infrared spectrophotometer comprising:
   a) applying a film forming liquid to at least one surface of an alkali halide crystal substrate which is substantially transmissive to the infrared energy generated by the spectrophotometer while the substrate is at least substantially at rest, said substrate being operatively connected to a rotating means at the axis of the rotating means;
   b) rotating the film forming liquid on the substrate at a speed and for a time sufficient for said film to form on said substrate exhibiting at least substantial radial symmetry;
   c) placing the thin film in said spectrophotometer to record the absorbance peaks created by the film and to create a record of such peaks as a comparative standard for use in calibration of the same or a different spectrophotometer from time to time; and
   d) periodically comparing the absorbance peaks of the standard with absorbance peaks created by said film when it is from time to time placed in the same or different spectrophotometer to determine whether and to what extent the comparative peaks occur at the same spectral frequencies or band locations or whether and to what extent the intensity or amplitude of the comparative peaks differ.

2. The method of claim 1 further comprising doping the substrate with an absorbing contaminant.

3. The method of claim 2 wherein the absorbing contaminant is boron.

* * * * *